Feb. 7, 1933.  A. MAREK  1,896,454
BRAKING DEVICE
Filed June 16, 1931   2 Sheets-Sheet 1
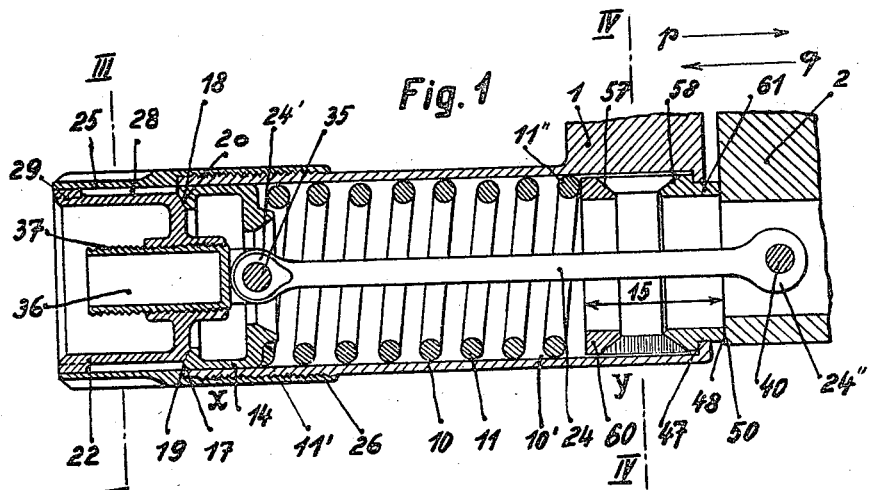
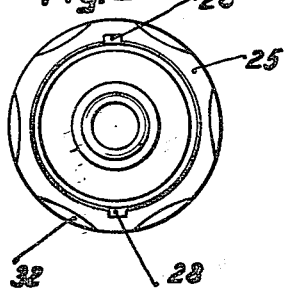
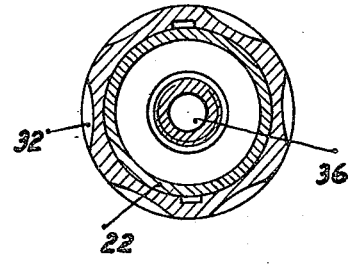
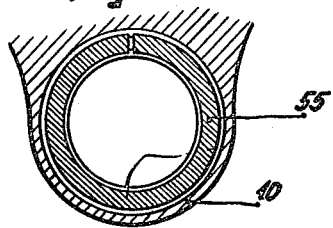
INVENTOR:
A. Marek
BY: Marks & Clerk
ATTORNEYS.

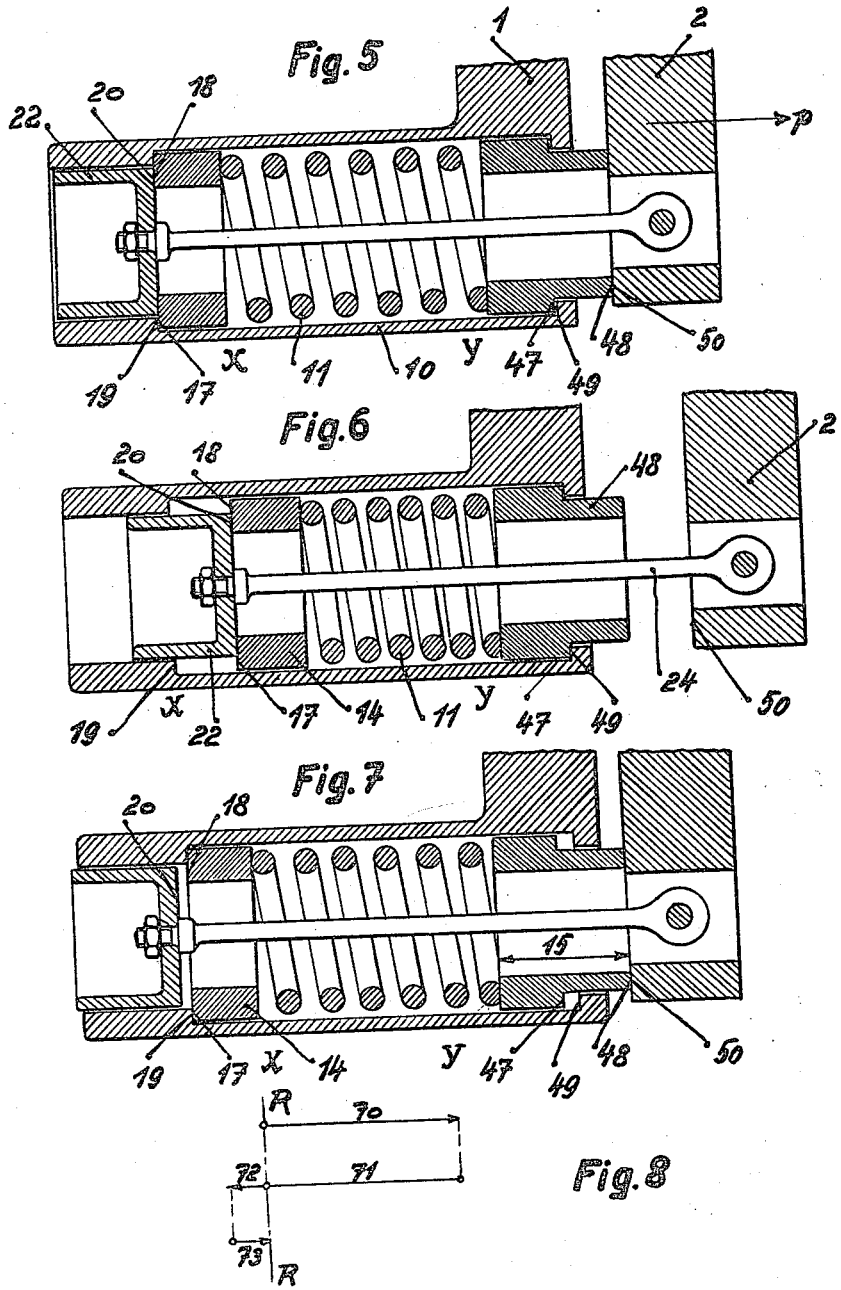

Patented Feb. 7, 1933

1,896,454

UNITED STATES PATENT OFFICE

ANTON MAREK, OF VIENNA, AUSTRIA, ASSIGNOR TO THE FIRM ČESKOSLOVENSKA ZBROJOVKA AKCIOVÁ SPOLEČNOST V BRNĚ, OF BRUNN, CZECHOSLOVAKIA

BRAKING DEVICE

Application filed June 16, 1931, Serial No. 544,842, and in Czechoslovakia June 20, 1930.

This invention relates to a braking device for machine parts which are moved relatively to one another, in particular for the parts of fire-arms, for example for braking the parts of a fire-arm which are moved on firing, or for braking the recoil movement of a gun with regard to its carriage, or the like.

The braking device according to the present invention is characterized by a structure having few and simple constructional parts, by light weight, and by great certainty of operation.

According to the present invention the braking device is provided with means for braking the moved parts and returning the same into the position of rest, and with damping means adapted to damp the reflex movements set up by the restoring force, which extend beyond the position of rest, and to return the moved parts finally to the position of rest.

One form of construction for the braking device according to the present invention is illustrated, by way of example, in the accompanying drawings, in which:—

Fig. 1 shows the device in longitudinal section in the position of rest.

Fig. 2 is a side elevation of the device as seen from left to right.

Fig. 3 is a transverse section taken on the line III—III of Fig. 1.

Fig. 4 is a transverse section taken on the line IV—IV of Fig. 1.

Figs. 5, 6, and 7 show diagrammatically longitudinal sections of the braking device in the three most important positions.

Fig. 8 represents graphically the forces and movements of the braking device.

In the constructional example shown in the drawings, 1 and 2 are the relatively movable parts of a machine. The part 1 in the construction illustrated is stationary in its position, and the part 2 is arranged to move relatively to the part 1 in the direction of the arrows $p$ and $q$.

The braking device is provided with means $x$ which brake the movable part 2 in its relative movements in the direction of the arrow $p$, and is further provided with means $y$ adapted to damp the reflex movements of the part 2 produced by the restoring force, and to bring the part 2 back to the final position of rest.

Both the braking and restoring means $x$ and the damping means $y$ can take a great variety of forms, and can be connected in the greatest variety of ways with the movable and stationary parts 2 and 1. In the construction illustrated, the stationary part 1 is provided with a cylinder 10 in which is mounted a spring 11. The spring 11 bears at one end 11' against a piston 14 slidingly mounted in the cylinder 10, and with its other end 11'' against a piston 15 pertaining to the damping means $y$. The piston 14 has two stops 17 and 18. The stop 17 cooperates with a stop 19 which is formed on the cylinder 10 or on a part carried by the cylinder 10. The stop 18 cooperates with a stop 20 which is formed upon an auxiliary piston 22. The auxiliary piston 22 is connected by means of a rod 24 with the movable part 2.

In the example shown, the stop 19 is formed by a projecting annular edge of a cap 25 which by means of a thread 26 is screwed upon the cylinder 10.

The cap 25 is provided with longitudinal grooves 28 in which engage bosses 29 of the auxiliary piston 22. The auxiliary piston 22 is slidable longitudinally in the cap 25, but is prevented from turning therein by 28 and 29. In order that the cap may be easily gripped and turned, the same is provided at its periphery with depressions 32, which may for example be milled out.

The rod 24 is connected at one end 24', by means of a bolt 35, with a pin 36 which, by means of a thread 37, is screwed into the boss of the piston 22. The threads 26 and 37 are preferably of similar pitch. By rotation of the cap 25, the distance of the stops 19, 20 from the movable part 2 or from the anchoring part 40 of the rod 24 on the machine part 2 can be altered in order to vary the tension of the spring 11. In the construction shown the rod 24 is hung by means of its hook-shaped end 24' upon a pin 40 of the machine part 2. The connection of the auxiliary piston 22 with the movable part 2 can, however, be effected in another manner.

The damping means $y$ consist essentially of a friction brake, in the construction illustrated a braking piston 15. Whatever be the construction of the damping means $y$, the same is provided with stops 47, 48 which cooperates with stops 49, 50. The stop 49, which cooperates with the stop 47 of the damping means, is provided, in the construction illustrated, in the form of an annular shoulder on the cylinder 10; thus the stop 49 is part of the machine part 1. The stop 50, with which the stop 48 of the damping means $y$ cooperates, is provided on the movable part of the machine.

The braking piston 15 is provided with a braking member resilient in a radial direction, in the construction illustrated a split braking ring 55 which by means of oblique controlling surfaces 57, 58 is mounted between rings 60 and 61. The oblique controlling surfaces 57, 58 are so tapered that when the rings 60, 61 are moved towards one another the radially elastic braking ring 55 expands and is pressed outwards. Against the ring 60 there abuts the end 11'' of the braking spring 11. On the ring 61 there are provided the stops 47 and 48.

The cooperating stops 18, 20, and 48, 50 constitute means for transmitting movement and force, and are so connected with the movable part of the machine that (see Fig. 8) with the movements 70, 71 to one side of the position of rest R—R the stops 18 and 20, and consequently the braking means, come into operation, while with the movements 72, 73 to the other side of the position of rest the other stops 48 and 50, and with them the damping means, come into operation. The cooperating stops 17, 19 and 47, 49 constitute means for checking movement and for absorbing force, and these means are so connected with the stationary part 1 of the machine that (referring to Fig. 8) when movements 70, 71 of the part 2 take place to one side of the position of rest R—R, the damping means $y$ are cut out, and when movements 72, 73 of the said part take place to the other side of the position of rest, the braking means $x$ are cut out. With reference to Figs. 5 to 8, the manner of operation of the braking device according to the present invention is as follows:—

In the position of rest, the parts of the braking device assume the positions in which they are shown in Fig. 5. The stops 17, 19, 18, 20, 47, 49, and 48, 50 are in contact, respectively. If a force be exercised on the machine part 2, for example the recoil of a gun on being fired, this force being exercised in the direction of the arrow $p$, a movement 70, as indicated in Fig. 8, is brought about. During this movement the parts of the braking device cooperate in the manner indicated in Fig. 6. The auxiliary piston 22, connected by means of the rod 24 with the machine part 2, takes the piston 14 with it by means of its stop 20 and the stop 18. The spring 11 is compressed and hereby brakes the machine part 2 in its movement 70. The damping means $y$ remain in the position of rest, the stops 47 and 49 preventing the displacement thereof. The stops 48, 50, and the stops 17, 19 are not in engagement. After the braking of the moved machine part 2, the latter is returned by the tensioned spring 11 (compare the movement 71 in Fig. 8). During the return of the machine part 2, the parts of the braking device cooperate also in the manner indicated in Fig. 5. The braking device and the moved machine part 2 travel through the position of rest, and from that moment the parts of the braking means $x$ and the damping means $y$ cooperate in the manner indicated in Fig. 7. The auxiliary piston 14 comes to rest in consequence of its stop 17 meeting the stop 19; the stops 18 and 20 come apart. The moved machine part 2, on passing through the position of rest, comes into connection with the stop 48, while the braking piston 15 brings its stop 47 away from the stop 49. During the reflex movement 72 produced by the force of the spring 11 and extending beyond the position of rest R—R, the resilient spring 55 is pressed outwardly and against the inner wall 10' of the cylinder 10. The friction between 55 and 10, in combination with the counter-force of the spring 11, produces a rapid damping of the reflex movement 72, whereupon, through the resilient action of the spring 55 and of the spring 11, the damping means $y$ and the moved machine part 2 are brought into the position of rest (Fig. 5), in which position the moved machine part 2 and the entire braking device then remain.

The present braking device is suitable for relatively movable machine parts of all kinds, as also for braking the movements of whole machines against their foundations or mountings. In particular the present braking device is suitable for use in connection with fire-arms, for example for braking the parts moved by the recoil of firing a shot, or the breech mechanism moved backwards by the gas pressure, or the barrel which slides backwards, or for braking the whole gun with regard to its mounting, such as a carriage or a gun platform fixed to the ground.

The above described and illustrated braking device is to be understood as representing only one constructional example of the invention. Instead of a spring holding the braking means and the damping means under tension, a number of separate springs may be employed, and in like manner the connection between the device $x$ and $y$ and the moved and stationary parts of the machine, or the like, can be effected in the greatest variety of ways.

I claim:—

1. A braking and damping arrangement adapted, for instance, for the barrel of firearms, comprising a first machine part, a second machine part normally occupying a position of rest and movable relatively to the first part, braking means associated with the second part, frictional damping means for damping the reflex movement of the second part beyond the position of rest, and means alternately connecting the braking means and the damping means with the first part whereby during movement of the second part to one side of its position of rest only the braking means is brought into operation, the damping means being rendered inoperative, while, during the movement of the second part to the other side of its position of rest, the frictional damping means acts on the second part, the braking means being rendered inoperative.

2. An arrangement as claimed in claim 1, characterized in that said frictional damping means includes a friction body and controlling members coacting therewith to move the friction body into operative engagement with the first part, said controlling members being actuated by the second part.

3. An arrangement as claimed in claim 1, characterized in that said frictional damping means includes a friction body and controlling members coacting therewith to move the friction body into operative engagement with the first part, said controlling members being actuated by the second part, said friction body being constituted by a split ring, and said first part having a cylindrical portion engaged by said ring.

4. An arrangement as claimed in claim 1, characterized in that said damping means includes a friction body and members having tapered control surfaces coacting with said friction body to move the latter into frictional engagement with said first part, one of the last mentioned members being engageable by said second part and the other of the last mentioned members being yieldably mounted.

5. An arrangement as claimed in claim 1, characterized in that said braking means includes an element for braking the movement of said second part and returning the latter toward its position of rest, said damping means including a friction body, and pressure members adapted to move the friction body into frictional engagement with said second part, one of said pressure members being engaged by said second part and the other of said pressure members being engaged with said element.

6. An arrangement as claimed in claim 1, characterized in that said braking means includes a spring and a piston engaged thereby, and said damping means includes a friction developing piston, said spring being confined between said pistons and acting, partly, to brake the movement of the second part and, partly, to assist in the operation of the damping means.

7. An arrangement as claimed in claim 1, characterized in that said braking means includes a spring and a piston engaged thereby, and said damping means includes a friction developing piston, said spring being confined between said pistons and acting, partly, to brake the movement of the second part and, partly, to assist in the operation of the damping means, the first mentioned part including a cylinder receiving the pistons and spring and stops coacting with said pistons.

8. An arrangement as claimed in claim 1, characterized in that said braking means includes a spring and a piston engaged thereby, and said damping means includes a friction developing piston, said spring being confined between said pistons and acting, partly, to brake the movement of the second part and, partly, to assist in the operation of the damping means, the second mentioned piston including relatively movable piston parts and a friction body moved by said piston parts into operative position.

9. An arrangement as claimed in claim 1, characterized in that said braking means includes a spring and a piston engaged thereby, and said damping means includes a friction developing piston, said spring being confined between said pistons and acting, partly, to brake the movement of the second part and, partly, to assist in the operation of the damping means, the first mentioned piston including two piston parts, one of said piston parts coacting with said connecting means and the other piston part being movable relatively to said connecting means to permit said second part to move beyond its position of rest.

10. An arrangement as claimed in claim 1, characterized in that said braking means includes a spring and a piston engaged thereby, and said damping means includes a friction developing piston, said spring being confined between said pistons and acting, partly, to brake the movement of the second part and, partly, to assist in the operation of the damping means, the first mentioned piston including two piston parts, one of said piston parts coacting with said connecting means and the other piston part being movable relatively to said connecting means to permit said second part to move beyond its position of rest, and said second mentioned piston including two piston parts and a friction body interposed between the last mentioned parts.

11. An arrangement as claimed in claim 1, characterized in that said braking means includes a spring and a piston engaged thereby, and said damping means includes a friction developing piston, said spring being confined between said pistons and acting, partly, to brake the movement of the second part and, partly, to assist in the operation of the damping means, the first mentioned piston including two piston parts, one of said piston parts coacting with said connecting means and the other piston part being movable relatively to said connecting means to permit said second part to move beyond its position of rest, an adjustable connection between the second mentioned piston part and the second machine part, and adjusting means associated with the second piston part, said adjusting means carrying one of said connecting means.

In testimony whereof I affix my signature.

ANTON MAREK.